United States Patent
Erler et al.

(10) Patent No.: US 12,071,032 B2
(45) Date of Patent: Aug. 27, 2024

(54) INDUCTIVE CHARGING OF VEHICLES WITH SECONDARY-SIDE VOLTAGE MEASUREMENT AND FEEDBACK FROM THE SECONDARY SIDE TO THE PRIMARY SIDE

(71) Applicant: BRUSA Elektronik AG, Sennwald (CH)

(72) Inventors: Martin Erler, Dornbirn (AT); Marc Hanselmann, Frümsen (CH); Lukas Böhler, Wangs (CH); Marc Bosch, Sennwald (CH)

(73) Assignee: BRUSA Elektronik AG, Sennwald (CH)

( * ) Notice: Subject to any disclaimer, the term of this patent is extended or adjusted under 35 U.S.C. 154(b) by 693 days.

(21) Appl. No.: 17/254,218

(22) PCT Filed: Jun. 24, 2019

(86) PCT No.: PCT/EP2019/066660
§ 371 (c)(1),
(2) Date: Dec. 18, 2020

(87) PCT Pub. No.: WO2020/002227
PCT Pub. Date: Jan. 2, 2020

(65) Prior Publication Data
US 2021/0268920 A1  Sep. 2, 2021

(30) Foreign Application Priority Data
Jun. 29, 2018 (DE) ...................... 10 2018 115 860.2

(51) Int. Cl.
H02J 7/00 (2006.01)
B60L 53/122 (2019.01)

(52) U.S. Cl.
CPC ........ B60L 53/122 (2019.02); H02J 7/00308 (2020.01); H02J 2310/48 (2020.01)

(58) Field of Classification Search
USPC ........................................................ 320/108
See application file for complete search history.

(56) References Cited

U.S. PATENT DOCUMENTS 6,285,165 B1 *  9/2001  Terada ................ H02J 7/00302
                                                           320/134
9,269,489 B2    2/2016  Wu et al.
(Continued)

FOREIGN PATENT DOCUMENTS

CN      104134969 A     11/2014
CN      104205264 A     12/2014
(Continued)

OTHER PUBLICATIONS

English-language translation of International Preliminary Report on Patentability issued in International Application No. PCT/EP2019/066660 on Jan. 7, 2021.

*Primary Examiner* — Samuel Berhanu
(74) *Attorney, Agent, or Firm* — Hoffmann & Baron, LLP

(57) ABSTRACT

A secondary circuit device including a secondary coil for transmitting and/or receiving magnetic energy of a magnetic field and converting the magnetic energy into electrical energy, a transmission unit for transmitting the electrical energy, a detection unit, and a clamper circuit, wherein the magnetic field is generated by a primary coil of a primary circuit device; the transmission unit has an inlet for connecting the secondary coil; the transmission unit has an outlet for providing the electrical energy as voltage and/or current; the detection unit is connected to the inlet and/or the outlet of the energy transmission unit, in order to detect an overvoltage at the inlet and/or the outlet; and, when the overvoltage is detected, the detection unit is configured to (Continued)

influence the magnetic field in the secondary coil via the clamper circuit such that a current jump and/or a voltage jump is brought about in the primary coil.

11 Claims, 4 Drawing Sheets

(56) References Cited

U.S. PATENT DOCUMENTS

| | | | |
|---|---|---|---|
| 2007/0005466 A1* | 1/2007 | Rosenblatt | G06Q 20/12 705/14.27 |
| 2013/0024059 A1* | 1/2013 | Miller | H02J 7/00034 320/108 |
| 2013/0082647 A1* | 4/2013 | Yoon | H02J 50/10 320/108 |
| 2014/0292263 A1 | 10/2014 | Asselin | |
| 2014/0321169 A1 | 10/2014 | Mueller et al. | |
| 2015/0091521 A1 | 4/2015 | Blum et al. | |
| 2015/0224883 A1 | 8/2015 | Ichikawa et al. | |
| 2016/0221451 A1 | 8/2016 | Plum et al. | |
| 2017/0005466 A1 | 1/2017 | Nakano | |

FOREIGN PATENT DOCUMENTS

| | | | |
|---|---|---|---|
| CN | 104518548 A | | 4/2015 |
| CN | 105099001 A | | 11/2015 |
| DE | 102010054472 A1 | | 6/2012 |
| DE | 102013217816 A1 | | 3/2015 |
| DE | 112013004469 T5 | | 5/2015 |
| DE | 102014209729 | * | 12/2015 |
| DE | 102014209729 A1 | | 12/2015 |
| EP | 2868516 A1 | | 5/2015 |
| EP | 3103674 A1 | | 12/2016 |
| GB | 2546787 A | | 8/2017 |
| JP | 2012044762 A | | 3/2012 |

* cited by examiner

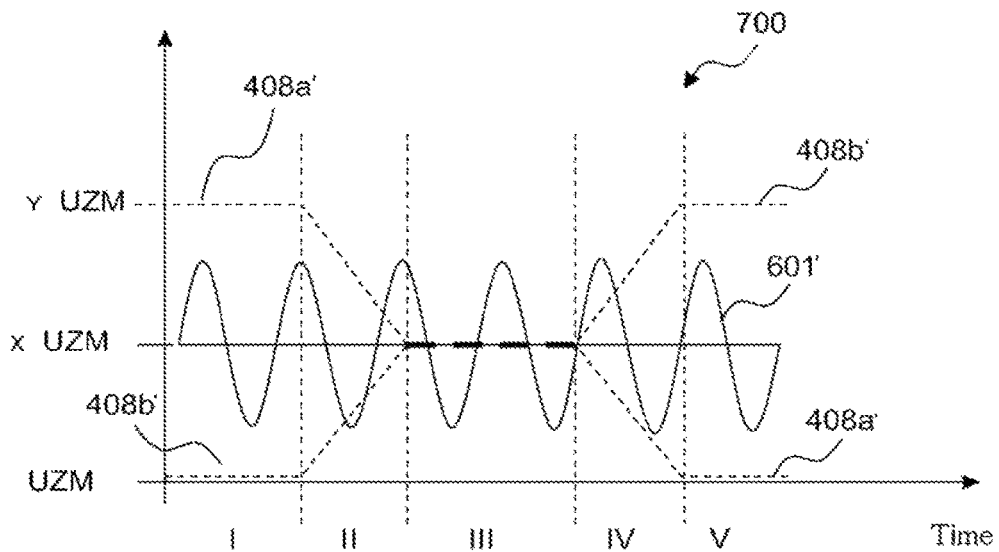
Fig. 7
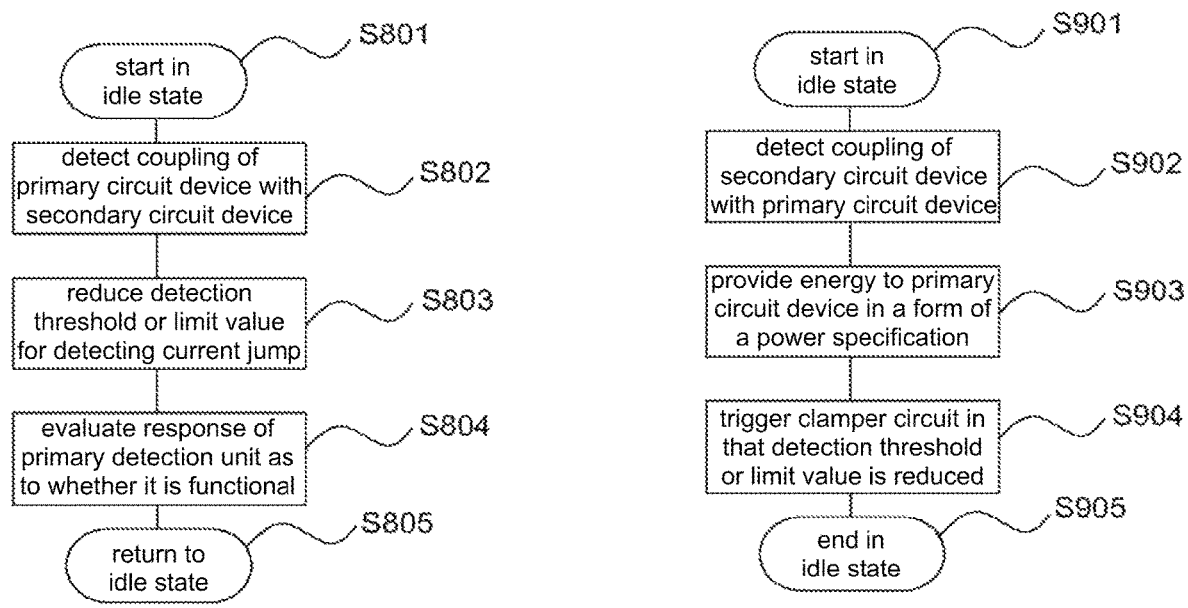
Fig. 8
Fig. 9

INDUCTIVE CHARGING OF VEHICLES WITH SECONDARY-SIDE VOLTAGE MEASUREMENT AND FEEDBACK FROM THE SECONDARY SIDE TO THE PRIMARY SIDE

CROSS-REFERENCE TO RELATED APPLICATIONS

The present application is the U.S. National Phase of PCT/EP2019/066660, filed on Jun. 24, 2019, which claims priority to German Patent Application No. 10 2018 115 860.2, filed on Jun. 29, 2018, the entire contents of which are incorporated herein by reference.

BACKGROUND

Field

The invention relates to the technical area of inductive charging. In particular, the present invention relates to a secondary circuit device, a primary circuit device, a system for energy transmission, a method for testing the secondary circuit device, and a method for testing a primary circuit device.

Related Art

In order to electrically charge a purely electric vehicle (EV, Electric Vehicle) or a hybrid vehicle (PHEV, Plug-in Hybrid-Electric Vehicle), which is operated with a combination of fuel and electrical energy, a system for inductive energy transmission can be utilized when the charging needs to take place without contact. A magnetic alternating field in a frequency range of from 25 kHz to 150 kHz is generated in such a system. In this case, it must be noted that, outside of this frequency range, the limit values for the emission of electromagnetic waves are stipulated by internationally valid standards. This is because, even though essentially a magnetic field is used for energy transmission, this is an electromagnetic wave due to the fact that the magnetic field inherently changes. Due to the slow changes in the field strengths, the electromagnetic wave used during inductive charging, however, has a wavelength of several kilometers.

In order to adhere to these limits for the emission, it should be noted that the magnetic alternating field used for energy transmission functions with a basic oscillation in a range of from 25 kHz to 150 kHz and only contains very minor harmonic waves. Therefore, filters are used to remove the interfering harmonic waves to the extent possible. In addition, in order to adhere to the internationally valid standards and guidelines, it must be ensured that an energy transmission only takes place when a certain quality of the coupling is achieved in that a certain alignment of the coupling elements is set with respect to one another, for example, by means of a positioning system as is described, for example, in publication EP 3 103 674 A1.

Publication EP 2 868 516 A1 describes a method for regulating the energy transmitted between two resonators of a system for contactless energy transmission.

A GPM (Ground Pad Module) with a primary coil is used on the stationary side and a CPM (Car Pad Module) with a secondary coil is used on the vehicle side as a coupling element for the energy transmission. The GPM and CPM form a transformer for the coupling and energy transmission. The physical alignment of the coupling elements with respect to one another is measured and set via a positioning signal, e.g., an RKS (Remote Keyless Entry System).

Different transmission routes and different transmission techniques are used for the energy transmission and the transmission of the positioning signal.

However, the energy transmission may be negatively impacted by the loss of a load on the secondary side.

SUMMARY

Thus, an object of the present invention may be considered enabling an effective transmission of energy.

Accordingly, a secondary circuit device, a primary circuit device, a system for energy transmission, a method for testing the secondary circuit device, and a method for testing a primary circuit device are indicated.

The subject matter of the invention is specified by the features of the independent claims. Example embodiments and further aspects of the invention are specified by the dependent claims and the following description.

According to one aspect of the present invention, a secondary circuit device is specified, which has a secondary coil for transmitting and/or receiving magnetic energy of a magnetic field and for converting the magnetic energy into electrical energy, particularly into current and voltage. In addition, the secondary circuit device has an energy transmission unit for transmitting the electrical energy, a secondary-side detection unit, and a clamper circuit unit or crowbar. The magnetic field is generated by a primary coil of a primary circuit device and is coupled into the secondary circuit device. For example, the magnetic field is coupled into the secondary coil by means of a loose coupling with a primary coil of the primary circuit device. The energy transmission unit has an inlet for connecting the secondary coil and, in addition, the energy transmission unit has an outlet for providing the electrical energy as a voltage and/or current. The secondary-side detection unit is connected to the inlet and/or the outlet of the energy transmission unit in order to detect an overvoltage at the inlet and/or the outlet of the energy transmission unit. Such an overvoltage, i.e., the exceeding of a definable voltage limit value, may be triggered, for example, by means of load shedding at the outlet of the energy transmission unit. The secondary-side detection unit is configured such that it influences the magnetic field in the secondary coil by means of the clamper circuit unit such that a current jump and/or a voltage jump is brought about in the primary coil once the secondary-side detection unit has detected the overvoltage at the inlet and/or the outlet of the energy transmission unit.

According to a further aspect of the present invention, a primary circuit device is indicated, which has an energy generation unit for providing electrical energy and a primary coil for converting the electrical energy into magnetic energy. Furthermore, the primary circuit device has a primary-side detection unit. The energy generation unit is connected to the primary coil, wherein the primary coil is configured for transmitting and/or receiving the magnetic energy. In addition, the primary-side detection unit is connected to the primary coil, and the primary-side detection unit is further configured to detect a current jump in the primary coil and to switch off the energy generation unit upon detection of the current jump. A current jump may be caused by the exceeding of a definable current limit value.

According to yet another aspect of the present invention, a system for energy transmission is obtained having a car-pad-module unit and a ground-pad-module unit. The car-pad-module unit has the secondary circuit device and the ground-pad-module unit has the primary circuit device, wherein the secondary circuit device and the primary circuit device are coupled together via a magnetic field, particularly are loosely coupled together, i.e., without the use of a ferrite core.

According to yet another aspect of the present invention, a method for testing a secondary circuit device is described, which initially has coupling of the secondary circuit device with a primary circuit device via a magnetic field. Accordingly, energy to be transmitted by the secondary circuit device is specified in the form of a power specification, for example, via a communication channel. Due to the reduction in a detection threshold for detecting an overvoltage in the secondary detection unit, the clamper circuit unit is triggered or actuated, and a current jump and/or voltage jump in the primary circuit device caused by this triggering of the clamper circuit unit is evaluated.

The functionality of the secondary detection unit can be tested by means of this test method.

According to another aspect of the present invention, a method for testing a primary circuit device is described, which has the detection of the coupling with a secondary circuit device. Subsequently, there is simulating of a current jump due to reducing of a detection threshold for detecting a current jump in the primary detection unit, and the reaction of the primary detection unit which is triggered by the reduction is evaluated.

The functionality of the primary-side detection unit can be tested by means of this test method.

It should be noted that, without limiting the generality, it is essentially assumed that the secondary-side detection unit is situated on the secondary side in the secondary circuit device and that the primary-side detection unit is situated on the primary side in the primary circuit device. However, the prefix and/or terms "primary" and "secondary" should essentially be understood as a name. Consequently, it is also possible to operate the secondary-side detection unit on the primary side in the primary circuit device and to operate the primary-side detection unit on the secondary side in the secondary circuit device such that the description also applies to the reverse case and/or reverse propagation directions for a flow of information and/or a triggering sequence. The same thing applies to the test method.

Normally, the safety function, however, is used for secondary-side protection, i.e., the hazard comes from the secondary side and the primary side must react quickly enough, basically without communication, in order to implement a rapid effect.

According to yet another aspect of the present invention, a computer-readable storage medium is provided, on which a program code is stored which executes at least one of the described methods when it is executed by a processor. A control unit or a controller may also utilize such a processor.

A floppy disk, a hard disk, a USB (Universal Serial Bus) storage device, a RAM (Random Access Memory), a ROM (Read Only Memory), or an EPROM (Erasable Programmable Read Only Memory) is used as a computer-readable storage medium. An ASIC (Application-Specific Integrated Circuit) or an FPGA (Field-Programmable Gate Array) as well as SSD (Solid-State-Drive) technology or a flash-based storage medium may also be used as the storage medium. A web server or a cloud may likewise be used as the storage medium. A communication network may also be considered a computer-readable storage medium, such as, for example, the Internet, which may enable the downloading of a program code. Wireless network technology and/or wired network technology may also be used.

According to yet another aspect of the present invention, a program element is provided, which executes at least one of the methods when it is executed by a processor.

By means of the clamper circuit unit, a change in the current and/or voltage ratios and/or the output on the secondary side is brought about, which change has an impact as well in a change of the current and/or voltage ratios and/or the output on the primary side due to the magnetic coupling between the primary circuit device and the secondary circuit device caused by the magnetic feedback. This change in the current and/or voltage ratios and/or the output propagates opposite the propagation direction of the energy and can be detected in the primary circuit device. The change in the current and/or voltage ratios and/or the output can be interpreted as information which propagates opposite the propagation direction of the energy. For example, a switching and changing of a voltage on the secondary side by means of the clamper circuit unit starts to occur as a current jump on the primary side. This current jump contains a piece of information. This information can be evaluated by the primary circuit device on the primary side and utilized to switch off the supply of energy. The response time of this transfer of information on a physical plane can be greater or faster than a transmission system which functions with several communication layers, for example with OSI (Open Systems Interconnection) layers or a WLAN (Wireless LAN). Due to the evaluation of the physical information, the primary circuit device can therefore react more quickly to a malfunction on the secondary side than it could react if a complex communication system was used. Consequently, the utilization of the physical information for a rapid switch-off of the supply of energy can occur on the primary side.

In order to differentiate the rapid communication channel from a protocol-based communication channel, the term "physical channel" or "physical feedback channel" is used in this text without a limiting effect, even if a protocol-based communication channel also uses a physical transmission.

Due to targeted actuation of the clamper circuit unit and due to the evaluation of the states resulting from this actuation, the function of this physical feedback channel can be tested. The components contained in the formation of the physical feedback channel, such as, for example, comparators or control units, can thereby be tested. Due to the reciprocity of the signal propagation, a conclusion can be made about the functionality of the channel in both directions.

The physical feedback channel can be used in parallel with another communication channel, for example in parallel with a protocol-based communication channel. In order to ensure that the quick response of the feedback channel is not slowed by software layers, it should be noted that essentially only hardware components with correspondingly short response times, for example a comparator, are used in the structure of the physical feedback channel. Software components which run, for example, on a control unit or a controller can be used for operations which are not time-critical, such as the setting of switching thresholds for the comparators.

According to another aspect of the present invention, the secondary-side detection unit has a secondary-side comparator for detecting the overvoltage, which comparator can be utilized for the configuration of a rapid feedback channel. The primary-side detection unit can likewise have a primary-side comparator for detecting the current jump.

As an alternative or supplement to the detecting of the current jump, it is also possible to detect a current jump in the primary resonant circuit by means of the primary-side detection unit. The measurement of the voltage jump can be utilized when an evaluation of the voltage measurement does not take place for another purpose.

According to a further aspect of the present invention, the secondary circuit device has a secondary-side control unit, wherein the secondary-side control unit is configured for specifying a limit value of the secondary-side comparator.

According to yet another aspect, the clamper circuit unit of the secondary circuit device is configured to respond with at least one protective measure upon the detection of the overvoltage at the inlet and/or at the outlet of the energy transmission unit, which protective measure is selected from the group of protective measures consisting of the short-circuiting of the inlet of the energy transmission unit, the short-circuiting of the outlet of the energy transmission unit, the detuning of the energy transmission unit, and the splitting of an oscillating circuit formed with the secondary coil.

These protective measures lead to an unloaded oscillating circuit, which leads to an overcurrent on the primary side which can then be detected.

In one example, the secondary-side detection unit may be configured to modify an impedance and/or quality and/or a resonant frequency of the energy transmission unit upon the detection of the overvoltage at the outlet.

The change in the resonant frequency of the energy transmission unit can be implemented by switch-on and/or switch-off of a capacitor in the energy-directing device.

The changing of the resonant frequency may lead to a detuning of the energy-directing device and thus to detuning of the transmission path such that the outlet is protected from excessive energy and/or supply of power, even if energy is still being supplied on the part of a primary circuit device. Thus, an overvoltage can be reduced or even substantially completely avoided, for example, upon load shedding of a load at the outlet.

In addition, the energy transmission unit may have a rectifying device. In this example, the change in the quality of the energy transmission unit can be achieved by means of the short-circuiting of the rectifying device.

The short-circuiting of the rectifying device may take place at the inlet of the rectifying device and lead to an oscillating transmission circuit formed by the secondary coil with a capacitor and/or a further coil such that only a fraction of the incoming energy on the secondary coil is transmitted via the energy transmission unit. Due to the change in the quality, the incoming energy is reflected via the secondary coil, for example back to a primary circuit device. This reflection can then be detected in the primary circuit device, and the primary circuit device can cancel the energy transmission to the secondary circuit device in order to prevent an overvoltage at the outlet of the secondary circuit device.

In yet another example, the secondary-side detection unit is configured to provide a command and/or signal upon the detection of the overvoltage at the inlet and/or at the outlet of the rectifying device such that it can be transmitted via the magnetic field in order to control an energy transmission unit and to change the magnetic energy of the magnetic field.

Such a command and/or signal can be generated, for example, in the form of the reflected energy upon the change in the quality on the physical plane, whereby a quick switch-off of the energy generation can be achieved. However, as an alternative or supplement, such a command and/or signal can also be distributed via another communication channel, for example via a positioning signal channel and/or a protocol-based communication channel, particularly a WLAN communication channel. Because the magnetic field is essentially only available during the transmission of energy, the overvoltage can only be communicated, via the magnetic field, essentially during the transmission of energy to the primary circuit device. The communication may also be implemented even earlier or later before/after the transmission of energy by means of another separate channel.

For example, the secondary-side detection unit is configured to adapt the energy transmission unit upon the detection of the overvoltage at the inlet and/or the outlet of the rectifying device such that the electric reactive power is at least partially reflected and transmitted via the magnetic field.

The reflected reactive power can be evaluated by a primary circuit device in order to stop the generation of the energy.

In another example, the secondary-side detection unit is configured to interrupt the energy transmission unit and/or the secondary coil upon the detection of the overvoltage at the inlet and/or the outlet of the rectifying device.

In particular, the secondary-side detection unit may be configured to actuate a clamper circuit such that the energy transmission unit and/or the secondary coil is interrupted. In addition to the establishing of a physical connection of the secondary coil with the energy-directing device, the interrupting of the secondary coil may be understood as the splitting of an oscillating circuit formed with the secondary coil and a capacitor.

BRIEF DESCRIPTION OF THE DRAWINGS

Further example embodiments of the present invention are described in the following with reference to the figures.

FIG. 7 shows a time-voltage diagram of a detection threshold definable by means of the primary-side comparator for a function test of the primary-side comparator according to an example embodiment of the present invention.

FIG. 8 shows a flowchart of a method for testing a primary circuit device according to an example embodiment of the present invention.

FIG. 9 shows a flowchart of a method for testing a secondary circuit device according to an example embodiment of the present invention.

DETAILED DESCRIPTION

Figure 1:
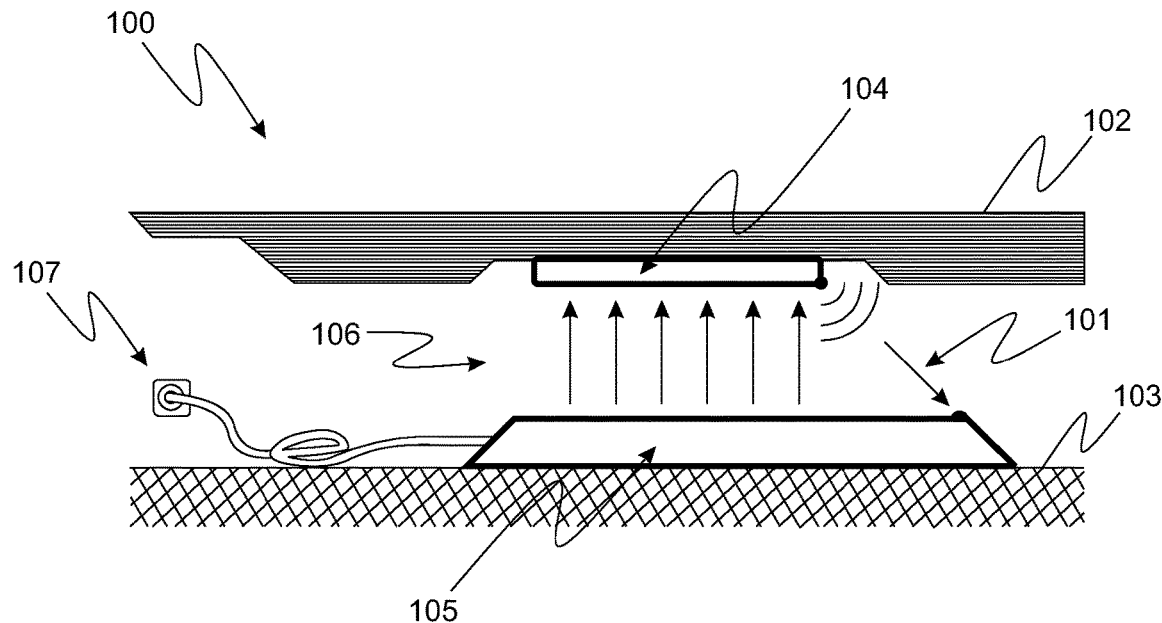
FIG. 1 shows an inductive charging system according to an example embodiment of the present invention.

The representations in the figures are purely schematic and not true-to-scale. In the following description of FIGS. 1 to 9, the same reference numerals are used for equivalent or corresponding elements.

In this text, the terms "capacitor" and "capacitance" as well as "coil" or "inductor" and "inductance" are used synonymously and should not be interpreted in a limiting manner, unless indicated otherwise. In addition, the terms "energy" and "power" are used equivalently and should not be interpreted in a limiting manner, unless indicated otherwise.

FIG. 1 shows an inductive charging system 100 or system 100 for the transmission of energy according to an example embodiment of the present invention. In this case, a side view of a system for contactless charging of an electric vehicle is shown. A car pad module (CPM) 104, which is used to supply the vehicle 102 with current, is situated underneath a vehicle chassis 102. A magnetic field 106 is used for the transmission of the energy, which magnetic field inductively provides the energy from a ground pad module (GPM) 105 fixedly mounted to a base 103. The energy needed for the charging is drawn from the main connection 107, which may be alternating current (AC) or direct-current (DC). A separate connection 101, which may use, for example, a wireless protocol such as a WLAN (Wireless LAN) or NFC, can be used for communication between the CPM 104 and GPM 105. This connection can be used as a feedback channel 101 or as a communication channel 101, via which the CPM 104 and GPM 105 can exchange information. Both the magnetic field for energy transmission 106 as well as the radio signal 101 are electromagnetic waves which may have, however, different frequencies.

Figure 2:
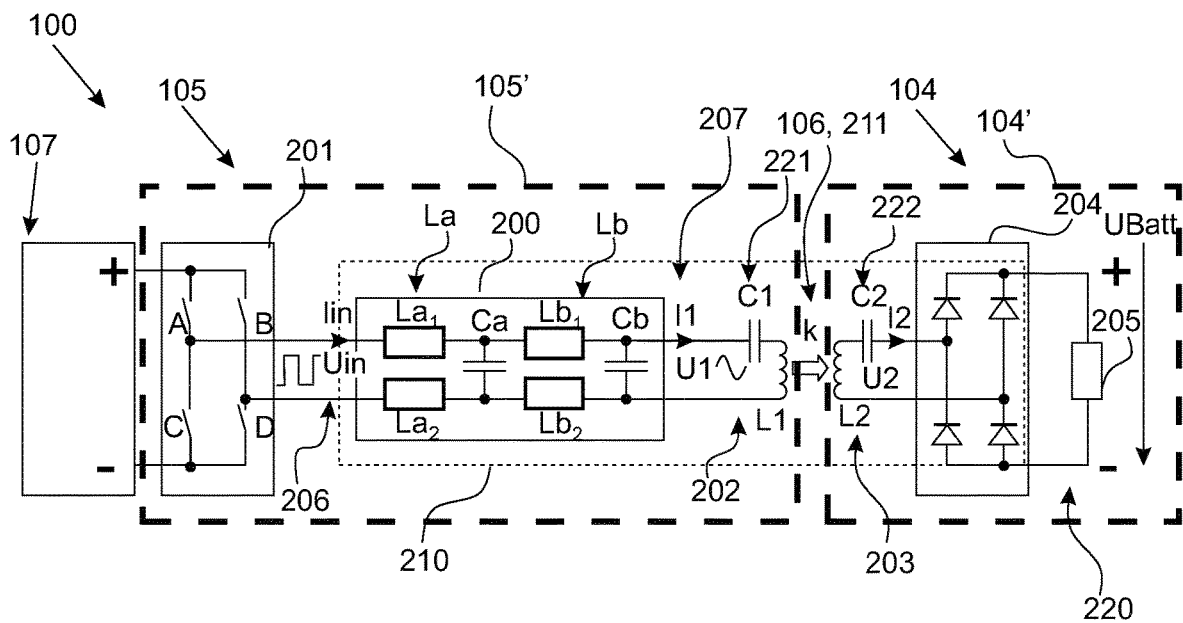
FIG. 2 shows a block diagram of an inductive charging system according to an example embodiment of the present invention.

FIG. 2 shows a block diagram of an inductive charging system 100 according to an example embodiment of the present invention. A system for inductive energy transmission is considered, which can be used for contactless charging of an electric vehicle. A magnetic alternating field 106 in a frequency range of from 25 kHz to 150 kHz, for example, is generated in such a system. In this case, it must be noted that, outside of this frequency range, the limit values for the emission of electromagnetic waves are stipulated by internationally valid standards. In order to adhere to these limits, it should be noted that the magnetic alternating field 106 functions with a basic oscillation in a range of from 25 kHz to 150 kHz and only contains very minor harmonic waves.

On the other hand, the efficiency of the power transmission should be as great as possible and therefore a square-wave signal is generated with the basic frequency of the magnetic alternating field with electronic switches within an inverter 201, for example, by means of a MOSFET or IGBT; this results in very low losses. However, the square-wave signal contains significant harmonic waves. These harmonic waves can be filtered out very well with a filter 200, for example an LC filter 200. The filter 200 in this case may be designed in different ways. A 4th order filter 200 is shown by means of example in FIG. 2; however, other configurations of capacitors and coils are also possible. The input current $I_{in}$ and the input voltage $U_{in}$ are applied at the inlet 206 of the filter 200. The filter 200 has two input coils $La_1$ and $La_2$, connected in parallel, and the filter input capacity Ca, as well as the output coils $Lb_1$ and $Lb_2$, connected in parallel, and the filter output capacitor Cb. Instead of the two input coils $La_1$ and $La_2$ connected in series, a single input coil La can be used. Instead of the two input coils $Lb_1$ and $Lb_2$ connected in series, a single input coil Lb can be used.

Figure 3:
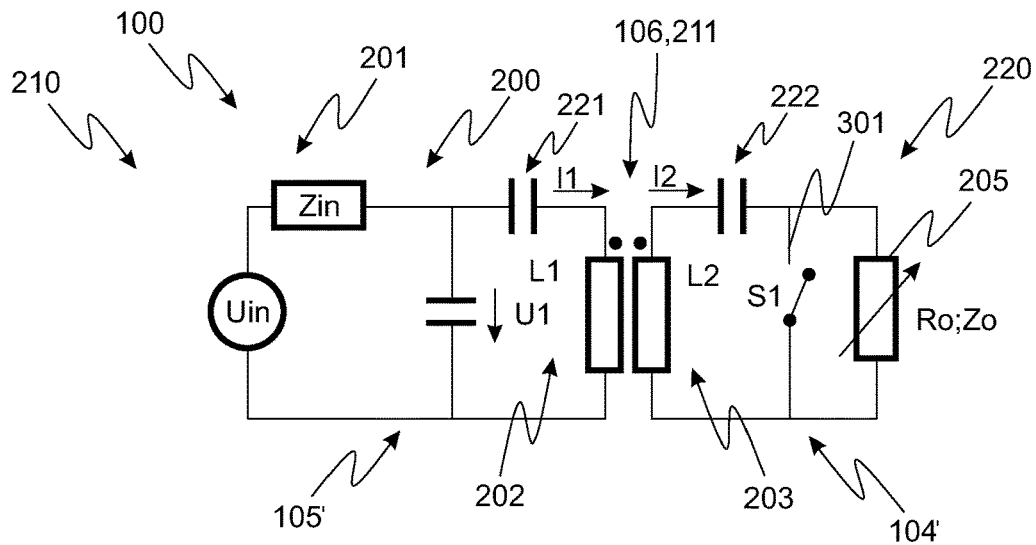
FIG. 3 shows a simplified representation of the inductive charging system from FIG. 2 according to an example embodiment of the present invention.

The manner of the configuration of the filter in the primary circuit essentially has no impact on the design of the secondary circuit device. As shown in FIG. 3, an energy transmission system 100 can also be operated without a filter with variable input impedance. The input impedance may also be zero Z1=0.

Input coils $La_1$ and $La_2$ are connected directly to the outlet of the inverter 201. In this case, directly means that no further structural element is connected in between. A capacitor connected in series in this case should not turn a direct connection into an indirect connection. The term "direct" may particularly be used to express that connection points of corresponding components coincide and/or have the same potential. Output coils $Lb_1$ and $Lb_2$ at the outlet 207 of the filter 200 are connected directly to coils $La_1$ and $La_2$ as well as the primary resonant circuit 202. The primary resonant circuit 202 is supplied with the voltage U1 and the current I1 or IL, which originates from the alternating current generated by the inverter 201. Due to the effect of the filter 200, the primary current I1 and the primary voltage U1 have a sinusoidal curve.

The primary resonant circuit 202 has the primary resonant coil L1 or primary coil L1 and the primary resonant capacitor C1 221. The primary resonant circuit 202 converts the current I1 and the voltage U1 into the magnetic alternating field 106. The magnetic alternating field 106 is coupled into the secondary resonant circuit 203 with a coupling factor k and transmits the energy from the primary circuit to the secondary circuit 203 by means of a resonant and inductive energy transmission.

The secondary resonant circuit 203 has the secondary resonant coil L2 or secondary coil L2 and the secondary resonant capacitor C2 222. Because the secondary resonant circuit 203 is adjusted to the resonant frequency of the primary resonant circuit 202, the secondary resonant circuit 203 is excited to oscillate by means of the magnetic field 106 to the extent that the secondary current I2 and the secondary voltage U2 result. These are supplied to the rectifying device 204 or to the rectifier 204, which may provide at its outlet 220 a direct voltage of a load 205, for example of a battery 205, of an intermediate circuit 205, of a traction circuit 205, or of an output-side HV-DC 205, on the side of the CPM 104.

The inductive charging system 100 is supplied via a direct-voltage source 107 or input-side HV-DC (High Voltage-Direct Current) and/or via alternating voltage 107.

The energy transmission system 100, for example, an ICS system 100, has a base station 105 or GPM 105, a remote device 104 or a CPM 104, wherein the base station 105 and the remote device 104 can be loosely connected to one another via an inductive coupling and the feedback channel 101. A loose coupling can be assumed upon a corresponding positioning of the CPM 104 as compared to the GPM 105.

The base station 105 or GPM 105 has the primary circuit 202, and the remote device 104 or CPM 104 has the secondary circuit 203. The primary circuit 202 has coil L1, and the secondary circuit has coil L2. If coils L1 and L2 are aligned with each other, magnetic fields 106, which are generated by the coils, can implement the other respective coil L1, L2. The part of the magnetic field which implements the other respective coil L1, L2 forms the inductive coupling with the coupling factor k. This coupling forms a loosely coupled transformer 211. The part of the magnetic field 106 which is outside of the other respective coil L1, L2 forms a stray capacitance. The lower the portion of the stray capacitance formed, the greater the coupling factor k. However, because no transformer with a core can be formed in which the coupling factor k is essentially constant due to the mobility of the GPM 105 and CPM 104 with respect to one another, the coupling factor with the loosely coupled transformer is variable and depends, for example, on the relative position of the GPM 105 and CPM 104 with respect to one another.

FIG. 3 shows a simplified representation of the inductive charging system 100 or system 100 for energy transmission according to an example embodiment of the present invention. The regulation of an ICS system 100 may contribute to safeguarding the functional security in an ICS system. Due to the strong magnetic fields 106 which are used to transmit power, there may be regulations for protecting the environment of an excessively strong magnetic radiation. These regulations may stipulate, for example, that when a field 106 is generated by a GPM 105 without a CPM 104 being available or when a CPM 104 is unfavorably coupled to the GPM, the field 106 is switched off after 2 s at the latest. Thus, it must be ensured that a determination can be made that the GPM 105 and the CPM 104 are coupled together via the field 106 according to regulations within a timeframe of 2 s. Otherwise, the field 106 must be switched off.

A WLAN 101, which is used for the communication between the GPM 105 and CPM 104, may have a cycle time of up to 300 ms. It can be ensured that the CPM and GPM are still coupled together via the channel 101 by means of the feedback. If the vehicle moves away and the CPM does not accept any power from the GPM, this is detected and the power supply to the GPM is suppressed. Even if a signal via the feedback channel 101 fails to appear for 2 s, the energy transmission may be interrupted for the sake of safety because it cannot be ruled out that the signal is failing to appear due to the loss of the coupling or a defect of a component of the feedback channel 101.

The startup of inductive charging is implemented with a constant duty cycle and a variable frequency of the inverter 201 or PWM (Pulse-Width-Modulation) generator 201, wherein the variable frequency is a frequency shift. The starting frequency at which the PWM generator 201 starts is set at the maximum possible frequency in order to set a maximum possible damping between the input variable, i.e., the duty cycle, and the output variable of the primary component 202 of the GPM 105.

If a suitable operating point is found, resonance forms between the primary component 202 and the secondary component 203, and energy can be transmitted between the primary component 202 and the secondary component 203 via the field 106. Depending on the operating point, this operating frequency or resonant frequency is set between 81.35 kHz and 89.5 kHz.

If a definable minimum output is not detected after one of these frequency bands is cycled through with a constant duty cycle or duty factor, then charging is not possible. Thus, if the GPM 105 transmits power which is not received by the CPM 104 as greater than a minimum threshold value, the startup process of inductive charging is interrupted. Consequently, the charging is locked or blocked when there is insufficient coupling between the GPM 105 and the CPM 104. Such an insufficient coupling can result with a large shift between the GPM 105 and the CPM 104. A pre-control characteristic curve ensures that the time interval of the startup process does not exceed a definable value, for example, of 2.0 s. This immediate interruption in the charging process during the startup phase when the definable minimum power is not achieved can ensure the safety during startup of the ICS 100 without communication being necessary between the GPM 105 and the CPM 104.

The greater the distance between the GPM 105 and CPM 104, the lower the frequency at which the power or energy can be transmitted. This means that the greater the distance between the GPM 105 and CPM 104, the lower the resonant frequency; or in other words, the resonant frequency depends on the distance between the GPM 105 and the CPM 104.

However, if the charging process is carried out and the coupling between the GPM 105 and CPM 104 is continually confirmed via the control circuit 210 with the feedback channel 101, there may be an overvoltage situation at the outlet 220. This is because a magnetically coupled system, particularly a loosely magnetically coupled system 100, has a similar system behavior as a current source. An inductive charging system 100, therefore, is such a loosely coupled system due to the mobility of the GPM as compared to the CPM. This means that the system 100 for energy transmission or the system 100 for inductive charging has high internal impedance at the outlet 220, similar to a current source. Upon shedding of the load 205, the system 100 attempts to further drive the current to the outlet 220. In the case of a load dump or load shedding, i.e., for example, when a fuse is triggered in the vehicle, a plug is disconnected, a line is interrupted, or the battery contactor is opened, the system functions like a current source at the outlet 220, due to the excited oscillating circuit and its further continual excitation on the part of the ground pad module 104, with a large internal resistance onto the DC intermediate circuit of the vehicle, which is connected at the outlet 220 and which is shown in FIG. 3 by means of the load 205. Parts of the energy which is stored in the oscillating circuit are thereby discharged into the high-impedance outlet 220, which can generate a very high voltage at the outlet 220 via the low capacitance of the outlet 220. This voltage may be far greater than the working voltage and configured voltage of the corresponding circuits in the vehicle, which are connected to the outlet 220, for example devices such as a DC/DC converter or motor converter, which are connected at the DC circuit at the outlet 220 and are represented by the resistor 205. This further driving leads to a voltage excess at the outlet 220 of the transmission system 100. Because of this voltage excess due to the load shedding, the components at the outlet of the transmission system 100, for example rectifiers or filters, are damaged as a consequence of the overvoltage.

In order to prevent damage during proper operation due to an increase in the output voltage at the outlet 220 over a definable limit, the secondary circuit device according to the invention provides for a crowbar 301, a clamper circuit unit 301, or a protective device 301 at any point in the secondary circuit device 104'. The protective device 301 detects a load shedding at the outlet 220 of the energy transmission system 100 and very quickly reduces the effective power transmitted to the outlet 220 and/or stops the energy transmission. The protective device 301 may use both hardware components and software components for the quick response. However, the use of software components is dispensed with to the extent possible in order to effect a quick response.

Figure 3A:
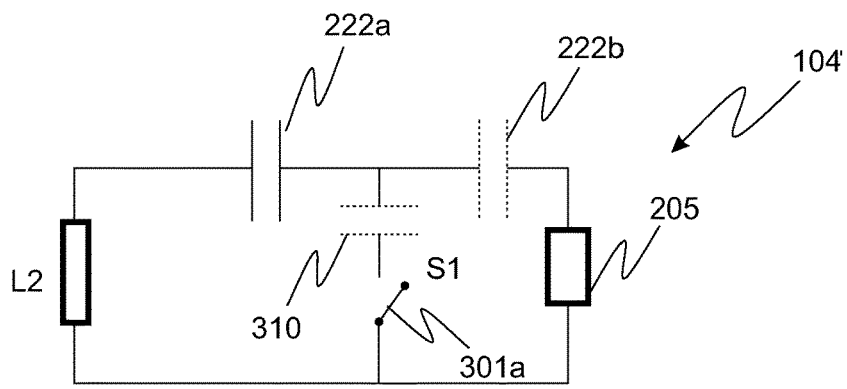
FIG. 3a shows a simplified block diagram of a secondary circuit device according to an example embodiment of the present invention.

FIG. 3a shows a simplified block diagram of a secondary circuit device according to an example embodiment of the present invention. The clamper circuit unit 301 or crowbar 301 can be used at any point in the secondary circuit device 104'. As shown in FIG. 3a, it is also possible to connect the crowbar 301 between various capacitor configurations such as, e.g., 222a, 222b, which substantially correspond to the capacitor 222, when S1 is open. This type of circuitry results in a detuning when the crowbar 301 is triggered, whereby the resonant frequency of the secondary resonant circuit 203 can be shifted greatly as compared to the resonant frequency of the primary resonant circuit 202, and thus reduces the current on the secondary resonant circuit when there is an active source on the primary side. The resonant frequency of the secondary resonant circuit 203 and of the primary resonant circuit 202 is approximately 85 kHz when these circuits are used for energy transmission. If S1 is closed and the total capacitance of the secondary resonant capacitor C2, 222, 222a, 222b is reduced, for example, due to the connecting of a series capacitor 310, which is connected in series to S1, the resonant frequency of the CPM increases, particularly the resonant frequency of the secondary resonant circuit 203, and removes itself even further from the primary resonance as if it were without the series capacitor 310, whereby very good protective properties can be achieved for the system 100. In another example, the capacitor 222b, which is a partial capacitor of the secondary resonant capacitor 222, can be disconnected upon a short-circuiting of the clamper circuit unit 301a by means of a switch S1.

In order to reduce the effective power transmitted to the outlet 220 and/or in order to stop the energy transmission, various mechanisms of action can be used alone or in combination.

One option for stopping the energy transmission is to use the feedback channel 101, after a detection of load shedding at the outlet 220 of the energy transmission system 100, in order to command the switch-off of the energy transmission on the primary side by means of a command via the channel 101, for example, the WLAN channel 101, at the inlet of the energy transmission system. However, because the channel 101 might use communication protocols which are at higher layers of the OSI protocol, this instruction to the primary circuit device 105' may be executed slowly.

Figure 4:
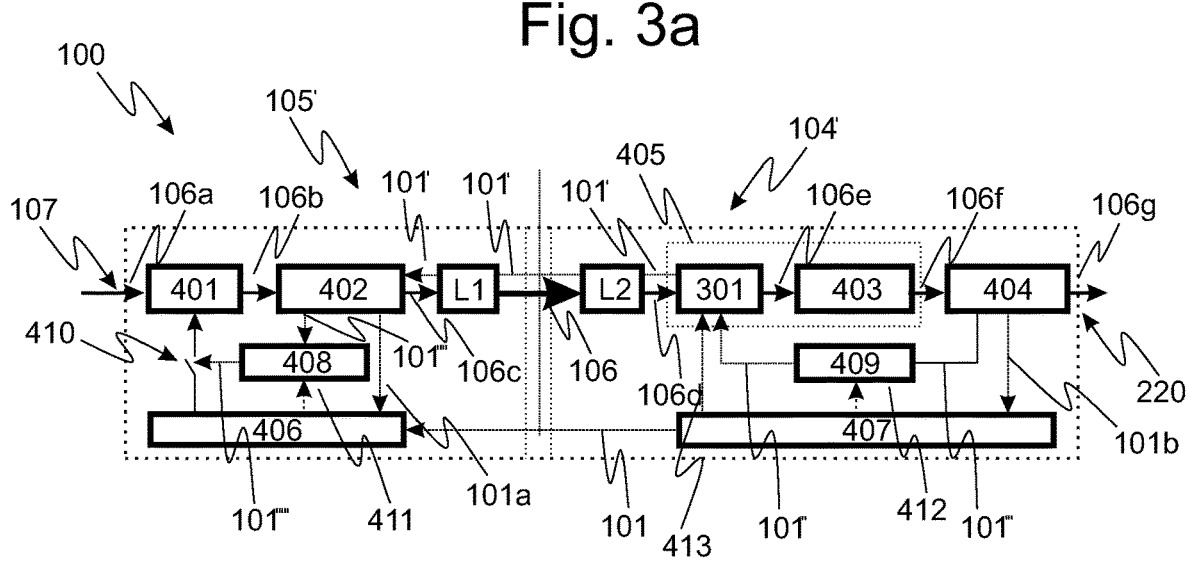
FIG. 4 shows a schematic block diagram of an energy transmission system with a quick communication channel according to an example embodiment of the present invention.

FIG. 4 shows a schematic block diagram of a system 100 for energy transmission with a quick communication channel according to an example embodiment of the present invention. In particular, three transmission paths with corresponding components are shown in this block diagram.

An energy transmission path 106, 106a, 106b, 106c, 106d, 106e, 106f, 106g extends, starting from an energy source 107, over the energy input 106a, over power electronics 401, and over section 106b to a primary-side current and/or voltage measuring device 402 and over section 106c to the primary coil L1. The one primary-side current and/or voltage measuring device 402 may be a part of a primary-side detection unit. The primary-side current and/or voltage measuring device 402 is particularly configured to measure a current I1 in the coil L1. The electrical energy is converted into magnetic energy in the coil L1 and transmitted to the secondary coil L2 via the magnetic field 106. The energy, which is converted back into electrical energy in the form of a current and a voltage, is provided, via the energy transmission section 106d, along the clamper circuit unit 301 and supplied to the secondary-side power electronics 403 via the energy path section 106d. These power electronics 403 have components for forming the output voltage and the output current, for example rectifiers 204 and filter components. The clamper circuit 301 and the power electronics 403 essentially form the energy transmission unit 405. The energy is provided to the outlet 220 of the system 100 for energy transmission via energy path section 106f and 106g and the secondary-side current and/or voltage measuring device 404. The secondary-side current and/or voltage measuring device 404 may be a part of a secondary-side detection unit.

The communication channel 101, which can use, for example, a wireless protocol such as WLAN, extends in a direction opposite the direction of the energy path 106, 106a, 106b, 106c, 106d, 106e, 106f, 106g. However, the communication channel 101 or feedback channel 101 is slow due to the use of a protocol. The feedback channel 101 is established between the primary-side control unit 406 and the secondary-side control unit 407, particularly of primary-side and secondary-side communication devices contained therein.

For rapid feedback, the secondary-side comparator 409 and the primary-side comparator 408 can communicate via a physical feedback channel 101'. During an energy transmission, this feedback channel is configured in the opposite direction as relates to the energy path 106, 106a, 106b, 106c, 106d, 106e, 106f, 106g via the magnetic field 106.

This physical feedback channel 101' can be used to detect load shedding at the outlet 220 of the energy transmission system 100 and to very quickly greatly reduce or even completely stop the effective power 106g transmitted essentially using hardware instead of software in order to react, for example, to the load shedding at the outlet 220.

The secondary-side comparator 409 can actuate the clamper circuit 301 directly via the control line 101" when it detects load shedding at the outlet 220 via the secondary-side voltage and/or current sensor 404 or the secondary-side current and/or voltage measuring device 404 and the measuring link 101''', in order to prevent damage on the secondary side or the CPM 104 due to the triggering of the secondary-side clamper circuit unit 301 or the clamper circuit unit arranged on the CPM side.

The triggering of the crowbar is basically not provided for protection of the primary side but for the outlet of the secondary side. The primary side represents the energy source, and then protects itself from the system response of the short-circuit independently by means of a switch-off, via the detection of the triggering of the crowbar.

Due to the magnetic coupling by means of the magnetic field 106 between the primary circuit device 105' and secondary circuit device 104', the event of actuation of the clamper circuit unit 301 or crowbar 301 directly impacts the primary side via the physical feedback channel 101' and particularly via the influence of the magnetic field 106, i.e., the response rate corresponds substantially to the propagation rate of a magnetic field. In particular, the influence of the magnetic field 106 occurs as a current change or a current jump, via the primary-side current and/or voltage sensor 402, in the primary-side comparator 408, which current change or current jump can be transmitted from the primary-side current and/or voltage sensor 402 or from the primary-side current and/or voltage measuring device 402 to the primary-side comparator 408 via the primary-side measuring link 101'''' When a definable threshold or a definable limit value is exceeded in the primary-side comparator 408, the primary-side comparator 408 ensures a switch-off of the primary-side power electronics, via the control line 101''''' and actuation of the switch-off device 410, and thus stops the supply of energy to the secondary circuit device 104'.

Due to the use of the physical feedback channel 101', the feedback channel 101 provided for communication between the CPM 104 and GPM 105, which uses a communication protocol such as, for example, WLAN and is thus slow, can be bypassed. The bypassing of the slow connection can be used for the fast triggering of processes which require a quick response time. The reason is that the feedback channel 101 might be too slow for such processes, because the protocol-based feedback channel only enables communication with a high latency and cycle time as compared to a required non-stop time, which should be less than 2 ms (<2 ms). In addition, it must be assumed with a protocol-based communication channel 101 that a few information packets which are used to fulfill the requirements of the protocol will malfunction or be damaged, thereby preventing the switch-off information from reaching the primary side, which represents a hazard source due to the provision of the energy during load shedding or a load dump.

The physical channel 101' thus represents a quick alternative for the communication of time-critical events which can be used parallel to the feedback channel 101 in order to ensure an immediate switch-off in the event of load shedding or a necessary emergency switch-off.

Thus, two redundant switch-off systems, for example, can also be implemented within the system 100 for energy transmission. A first switch-off system may have the primary-side control unit 406, the secondary-side control unit 407, and a second primary-side measuring link 101a, as well as the second secondary-side measuring link 101b, which are connected to the primary-side current and/or voltage measuring device 402 and/or the secondary-side current and/or voltage measuring device 404. The control unit 407, 406 may have a processor, microprocessor, or controller. A second switch-off system may have the primary-side comparator 408, the secondary-side comparator 409, and the first primary-side measuring link 101"", as well as the first secondary-side measuring link 101''', which are likewise connected to the primary-side current and/or voltage measuring device 402 and/or the secondary-side current and/or voltage measuring device 404.

Due to the use of the direct switch-off path 101', 101", 101''', 101"", 101""', the second switch-off system has less latency time and greater reliability than the first switch-off system which uses the switch-off path 101 via WLAN.

During the development of an emergency concept and/or a real-time behavior, it should be noted that when the load at the outlet 220 is switched off during load shedding, the output voltage at the outlet 220 increases greatly within 2 ms and that the primary side should switch off the supply of energy within this timeframe of 2 ms in order to prevent a maximum output voltage from being exceeded at the outlet 202. In addition, it should be noted that the WLAN connection 101 may be completely destroyed and is only switched off after a timeout of the connection, after 2 s for example, because an error protocol may provide that a defect in the transmission path 101 is only assumed after a timeframe of 2 s without any messages arriving, and the entire system 100 for energy transmission is switched off. However, the output voltage at the outlet 220 may reach a critical value within the 2 s, which may lead to damage to the component of the system 100 for energy transmission. Because the WLAN modules are not ASIL (Automotive Safety Integrity Level) certified, there may also be a suspension of the WLAN modules.

Thus, in order to ensure a quick response time, when load shedding is detected at the outlet 220 of the secondary-side detection unit 409 by means of the voltage sensor 404, the increase in the output voltage of the secondary-side comparator 409 is compared to a limit value or threshold definable by means of the secondary-side control unit 407. As soon as the voltage at the outlet 220 exceeds the definable limit or the definable detection threshold, the clamper circuit unit 301 is triggered. The triggering of the clamper circuit unit 301 generates a current jump on the primary side 105', particularly in the primary coil L1. On the primary side 105', the current I1 of the primary magnetic field 106 with the primary-side comparator is then compared to a limit value definable by means of the primary-side control unit 406. In order to detect the current, the primary-side current and/or voltage measuring device 402 may be formed as a current sensor 402. If the measured current value which is brought about by means of the secondary-side triggering of the clamper circuit unit 301 exceeds the definable limit value, the drivers of the power electronics 402 are automatically deactivated via the switch-off device 410.

The "short-circuit effect" of the clamper circuit unit develops as a current jump and/or voltage jump, particularly by means of an increase in the current and/or voltage on the primary side. If the load 205 is removed, the increase in the input voltage $U_{in}$ becomes larger as relates to the resonant current I1 via the filter 200 and leads to a current increase in the primary resonant circuit 202. This increase in current takes place within the response time with the same control voltage Uin and leads to a higher current I1.

In one example, the physical feedback channel 101', 101", 101''', 101"", 101""', 404, 409, 301, 402, 408, 410 may essentially have only logic modules. This overall logic of the feedback channel 101', 101", 101''', 101"", 101""', 404, 409, 301, 402, 408, 410 undergoes a self-test and/or function test before each start of a charging process.

FIG. 8 shows a flowchart of a method for testing a primary circuit device according to an example embodiment of the present invention. The method starts in an idle state S801. A detection of the coupling of the primary circuit device with a secondary circuit device takes place in state S802. Before an energy transmission is started, a detection threshold or a limit value for detecting a current jump is reduced in state S803 in the primary detection unit 408 in order to thereby simulate a current jump. In a further state S804 of the method, the response of the primary detection unit 408 is evaluated and assessed by means of the primary-side control unit as to whether the primary-side detection unit 408 is functional. The method then returns to the idle state S805.

In other words, a limit value of the primary-side comparator 408 is specified by the primary-side control unit 406 using a PWM signal (Pulse-Width-Modulation) via the primary-side setting link 411 such that a limit value of the current is exceeded, whereby a current jump, i.e., a change in a current value, can be simulated.

The difference in amplitude between the limit value and the momentary current value is used for triggering the comparator. A pulse duration or any other type of time constant of the current jump is essentially not evaluated. The points in time of the reference specification of the limit value are far apart from one another due to the primary-side control unit 406 and the response to a triggering of the crowbar. The reference threshold or the limit value for detection is specified in the ms range by the control unit 407 at the primary-side comparator 408; the response of the comparator 408 to an exceeding of the limit value takes place in the microsecond range and lasts approximately 10 μs.

The PWM signal has a duty factor, wherein a duty factor of 50% corresponds to a definable current limit value of 0 A. In another example, a duty factor which is selected from the ]0%; 100%] range or a duty factor which is greater than 0% may be interpreted as a definable current limit value of 0 A. Before each start of a charging process, a current limit value of less than 0 A is set at an inlet of the primary-side comparator 408 as long as the coil current I1 in the primary coil L1 is 0 A, that is as long as there is still no current flowing and no energy is being transmitted but a magnetic field is already established, in that the default duty factor of a value greater than 50% (>50%), which is set as the default, is set at a value less than 50% (<50%), such that the existing current of 0 A exceeds the definable current limit value of less than 0 A. The setting of various duty factors is also shown in FIG. 7.

The limit value is set by a microcontroller or a control unit 406 using the momentary effective current value of I1. This limit value is updated with a very slow time constant and sets the current filtered measured value I1 with an offset as a limit value for the primary-side comparator 408. After a triggering of the comparator 408, the triggering is implemented by means of the control unit 406. For example, after triggering of the comparator, a memory state of a latch or sample-and-hold element used in the comparator changes from the logic state of 0 to 1. This state can then be set back to 0 via a control line 411 or reset line 411 after the analysis by the control unit 406. As long as the state of the logical 1 is present, the source 107 is blocked by the hardware by means of the switch-off device 410, and thus the drivers 401 are deactivated. The primary-side control unit 406 can be used to check whether the switch-off device 410 has been actuated, and thus there can be an analysis as to whether the primary-side comparator 408 has been triggered. Consequently, the functionality of the primary-side comparator 408 can be checked by means of this test method.

FIG. 9 shows a flowchart of a method for testing a secondary circuit device according to an example embodiment of the present invention. The method starts in an idle state S901. A coupling of the secondary circuit device 104' with a primary circuit device 105' via a magnetic field 106 takes place in state S902. In state S903, energy to be transmitted by the secondary circuit device is provided to the primary circuit device 105' in the form of a power specification. The specification can be transmitted, for example, via the feedback channel 101. Due to the specification, the secondary circuit device requests a definable output with the primary circuit device 105'. In state S904, the clamper circuit unit 301 is triggered in that a detection threshold or a limit value for detecting the overvoltage in the secondary detection unit 409 is reduced. This detection threshold can be transmitted from the secondary-side control unit 407 to the secondary-side detection unit 409 via the secondary-side setting and/or query link 412. In addition, there is an evaluation of a current jump in the primary circuit device 105', particularly in the primary-side detection unit 408 and/or in the primary-side control unit 406. Subsequently, the test method ends in an idle state S905. The test method for the secondary circuit device 104' requires that the magnetic field 106 is established, and a nonhazardous transmission of energy or transmission of power of 500 W, for example, is occurring. The physical feedback channel 101' can be established via the magnetic field 106.

In other words, in order to test the secondary circuit device 104' via the feedback channel 101 or WLAN channel 101, a command is sent from the secondary circuit device 104' and the primary circuit device 105', which command ensures that the primary circuit device 105' sets a charging capacity of 500 W, for example, on the secondary side within 2 s.

Before this test method is executed, a constant output of 500 W is set. The setting of a constant output ensures that the protective mechanisms, particularly the comparators 408, 409, are only tested upon a positive, transmitted effective power, i.e., a prerequisite for the test is that oscillating circuits 202, 203 are coupled together and a load is present. If the coupling is too profound, i.e., a smaller coupling factor is determined which is zero (k→0) or if no load is connected, for example, when only a capacitor is available at the outlet 220 but no battery 205, this results in an overcurrent I1 or an exceeding of the limit value in the primary device 105' set in the comparator 408, i.e., the comparator would be triggered with overcurrent, even without actuation by the clamper circuit unit S1 302. The detection unit 409 or primary-side control unit 409 only makes a statement regarding the correct functionality of the mechanism when an effective power has already previously been successfully set.

The secondary-side control unit 407 measures a voltage value at the outlet 220, which results upon the set output of 500 W, for example. The voltage measurement at the outlet 220, to which an HVDC circuit and/or a battery can be connected, is carried out by means of the current and/or voltage measuring device 404, which is designed as a voltage measuring device 404 in this case. Once the current value of the output voltage has been determined by the secondary-side control unit 407, the secondary-side control unit 407 reduces the detection threshold of the secondary-side comparator 409 for the clamper device 301, via the secondary-side setting and/or query link 412. The voltage value is reduced to a voltage value which is less than the voltage value which previously had been measured as the output voltage value at the outlet 220, as the battery voltage, or as the HVDC voltage value. Due to the reducing of the detection threshold to less than the currently applied output voltage value, a voltage increase is simulated at the outlet 220 after a load shedding, and the secondary-side comparator 409 switches, whereby the clamper circuit unit 301 is triggered, particularly switched.

Figure 5:
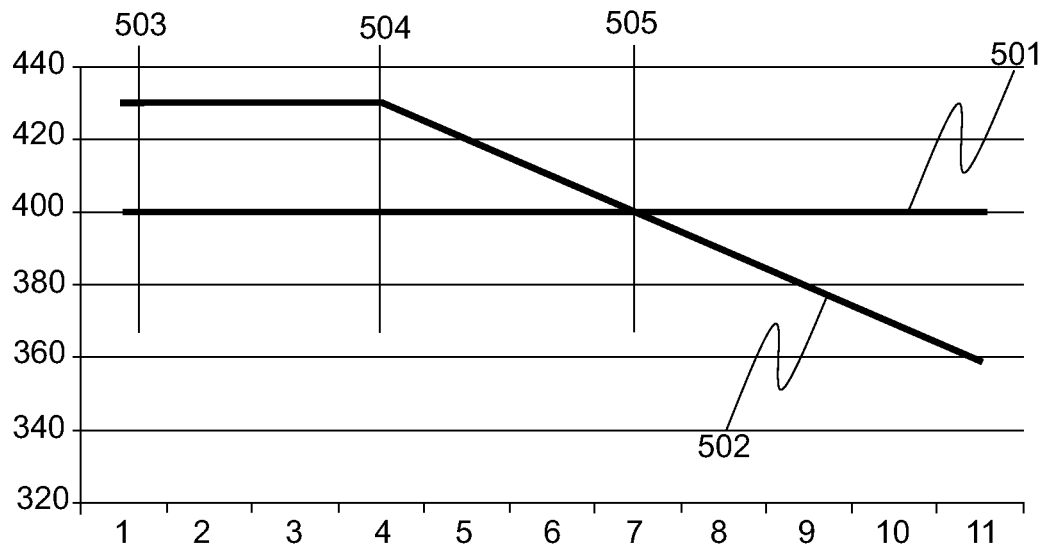
FIG. 5 shows the curve of a detection threshold as compared to an output voltage during a trigger test in a time-voltage diagram according to an example embodiment of the present invention.

FIG. 5 shows the curve of a triggering threshold as compared to an output voltage during a trigger test in a time-voltage diagram according to an example embodiment of the present invention. The time is plotted in ms on an x-axis and a voltage is plotted in V on a y-axis in the diagram. Furthermore, the voltage curve of the output voltage, of the battery voltage, or of the HVDC voltage, which essentially has a constant curve over time, is represented as curve 501. The voltage curve of a definable secondary-side detection threshold, of a definable secondary-side limit value, or of a definable secondary-side triggering threshold is shown as curve 502. In order to implement a function test of the clamper circuit unit 301 despite the constant voltage curve 501 of the output voltage at 400 V, the detection threshold is reduced from a value of 430 V to less than 400 V.

At point in time 503, the function test is started and the current value of the output voltage 501 is measured. A voltage value, for example, of 400 V is determined in this case. There is a wait time of approximately 400 ms, for example, until point in time 504, at which time the reducing of the definable detection threshold is started. Starting at point in time 504, the definable detection threshold is reduced linearly until it reaches the starting voltage value after a maximum of 500 ms, for example, and this leads to a triggering of the clamper circuit unit 301 once the value drops below this lower limit value.

The triggering of the clamper circuit unit 301 or the switching of the clamper circuit unit 301 can be detected by the secondary-side control unit 407 via the setting and/or query link 412 and via the secondary-side comparator 409 and not directly via the clamper circuit unit 301. The control unit 407 is connected to a memory module or latch of the comparator 409 via the setting and/or query link 412. The memory module obtains the state of the clamper circuit unit 301 after a triggering of the comparator and maintains it until the secondary-side control unit 407 deletes the memory module again, for example, by means of a reset. The setting and/or query link 412 can be used to delete the memory module in the comparator 409.

Because the reduction in the detection threshold has been carried out by the secondary-side control unit 407, the secondary-side control unit 407 knows the voltage value 502 at point in time 505 at which the clamper control unit 301 is triggered. This voltage value corresponds to the voltage measurement with the secondary-side comparator 409. This voltage measurement is present in the secondary-side control unit 407, just like the output voltage 501 determined at the start of the method. Both voltage measurements have been carried out by means of the secondary-side voltage measuring device 404, but at different points in time and/or while using various measuring methods, for example, a first measuring method which the secondary-side comparator 409 executes and which provides for an analog measurement, and a second measuring method which the secondary-side control unit 407 executes and which carries out a digital measurement.

The initial voltage measurement was determined by the secondary-side control unit 407 via the secondary-side measuring link 101*b*, and the voltage measurement carried out by the secondary-side comparator 409 was determined via the measuring link 101'''. The voltage measurement of the secondary-side control unit 407 can then be compared to the voltage measurement of the secondary-side comparator 409 after the triggering of the comparator in the secondary-side control unit 407.

By means of the secondary-side current and/or voltage measuring device 404, the output current at the outlet 220 can be determined by the secondary-side control unit 407 via the secondary-side measuring link 101*b*. In order to verify a correct function of the secondary circuit device 104', the secondary-side control unit 407 must determine that the output current at the outlet 220 collapses, i.e., essentially lowers to 0 A with a tolerance of +−0.3 A, in the same or next measuring period in which the secondary-side control unit 407 has detected the trigging of the clamper circuit unit 301. A collapsing of the output current verifies the correct function of the protective mechanism. When the current of the outlet is 0 A, the outlet is clearly disconnected with a very high level of probability, i.e., the protective mechanism has executed the function correctly and the effect can be validated. If the collapsing of the output current is determined, the secondary-side control unit 407 can assume the functionality of the clamper circuit unit 301. If the collapsing of the output current is not determined, the secondary-side control unit can conclude there is a malfunction in the clamper circuit unit and display a defect and/or cancel a charging process.

Due to the triggering of the clamper circuit unit, the current I1 also increases in the primary resonant circuit 202, which generates the primary magnetic field 106. This increase in current or current jump, or alternatively even a voltage jump, is transferred from the primary-side current and/or voltage measuring device 402 to the primary-side comparator 408, which actuates the switch-off device 410. Thus, the secondary-side control unit 407 can expect to be notified of an emergency switch-off of the switch-off device 410 via the primary-side comparator 408, for example via the communication channel 101, within a defined time, after the control unit has triggered the clamper circuit unit 301.

If the current I1 in the coil L1 does not increase with jumps, i.e., the current does not exceed the preset limit value, the primary-side control unit 406 will not enable any longer charging within the existing WLAN connection. As long as the components 105', 104' are connected via the communication channel 101, particularly via WLAN, the primary component 105' follows the command of the secondary component after a certain time. On the other hand, in the absence of an established communication channel 101, for example an established WLAN connection, there is a transition into a safer failback-safe state, a malfunction, an error state, and/or standby state after 2 s. This means that if the primary component 105' does not determine any current increase, the secondary component will continually actuate the crowbar 301 and wait until the primary component 105' reaches a timeout. The fault state is reached when the crowbar triggering has failed, the diagnostics of the crowbar triggering or information being transmitted from the comparator 409 to the control unit 407 has failed, or no confirmation or no acknowledgment signal, for example, that an overcurrent I1 has been detected, has been obtained by the primary component. If the communication channel 101 fails, for example the WLAN connection, the primary component 105' goes into a safer state anyway after 2 s.

The same thing may apply to a voltage jump.

If the primary-side comparator 408 does not lead to switch-off of the drivers 401, even though the clamper circuit unit 301 has been triggered, the generating of the magnetic field 106 is ended via the actuation of the switch-off device 410 by means of the primary-side control unit 406, and no further charging is enabled, because the physical feedback channel 101', 101", 101''', 101"", 101''' ", 404, 409, 301, 402, 408, 410 and/or one of its components appears to be defective.

Figure 6:
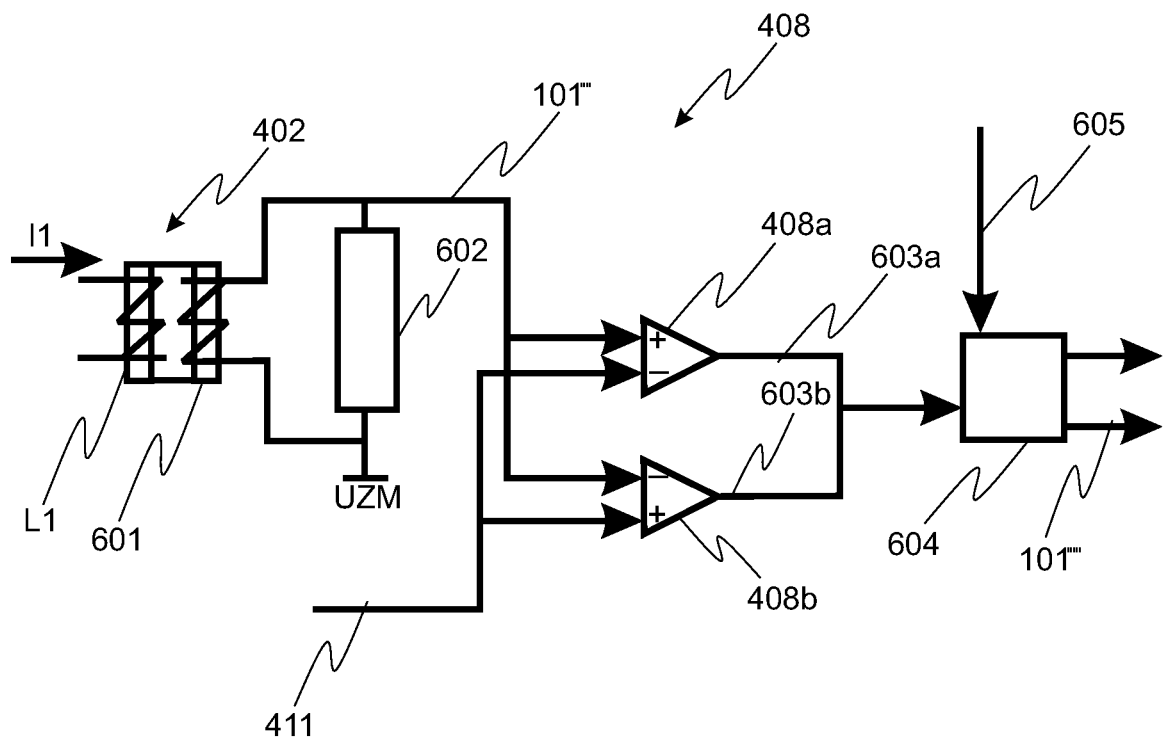
FIG. 6 shows a block diagram of a primary-side comparator according to an example embodiment of the present invention.

FIG. 6 shows a block diagram of a primary-side detection unit, particularly a primary-side comparator 408, according to an example embodiment of the present invention. The primary-side comparator 408 obtains a measured value of the current I1 via the current measuring coil 601 of the primary-side current and/or voltage measuring device 402. The current is indirectly measured via a voltage at the current measuring coil 601. The current measuring coil 601 is magnetically coupled to the primary coil L1 and forms a transformer with this primary coil L1. The shunt 602, which is arranged parallel to the current measuring coil 601 and is connected to the potential UZM, protects the primary-side comparator 408 from an overvoltage. The measuring voltage, which corresponds to the current I1, is provided to the primary-side comparator 408 via the measuring link 101"", which comparator is designed as a dual comparator or symmetrical comparator with the two operation boosters 408*a*, 408*b*. The measuring voltage is supplied to the positive input of the first operation booster 408*a* and supplied to the negative input of the second operation booster 408*b*.

Each of the operation boosters 408*a*, 408*b* obtains, via the setting link 411, a definable primary-side detection threshold via a PWM signal. The PWM signal is supplied to the negative input of the first operation booster 408*a* and supplied to the positive input of the second operation booster 408*b*. The outputs 603*a*, 603*b* of the two operation boosters 408*a*, 408*b* are combined and supplied to the latch 604. The latch 604 can be reset via the reset line 605 and is designed as a sample-and-hold element in order to provide a stable value of the comparison of the momentary current value I1 with the primary-side detection threshold on the control line 101"". The control line 101"" is active when a current jump is detected on the primary side, i.e., when the voltage value on the first primary-side measuring line 101"" exceeds the voltage value of the positive peak detection threshold or the positive limit value provided via the setting link 411. The comparison is carried out with the positive and negative analog peak measurement of the current. The control line 101'''' is connected to the switch-off device 410 (the switch-off device 410 is not shown in FIG. 6). Because all components of the comparator 408 shown in FIG. 6 are constructed with discrete structural elements, a quick detection of a voltage jump of I1 can take place.

The PWM signal is converted into an analog direct voltage with analog components (not shown in FIG. 6), which direct voltage is used as the detection threshold and is provided via the setting link 111. This detection threshold is positively compared with the positive peak of the current, particularly the voltage corresponding to the current at 101'''', and is compared as a negative threshold with the negative peak value of the current, particularly of the voltage corresponding to the current at measuring link 101''''. In this case, all voltages are defined as relates to a reference potential UZM, for example GND or 0 V of the circuit. The shunt 602 is connected to the UZM. The current measuring coil is used for the current measurement in the primary circuit. The configuration of the primary-side transformer 408 also corresponds to the configuration of the secondary-side transformer, which measures the current at the outlet 220 via the current measuring coil. The current measuring coil 601 of the secondary-side comparator 409 can be assigned to the current and/or voltage measuring device 404.

The outlet from the memory module 604 or latch 604 has the function of reporting the state of the memory and of blocking the drivers simultaneously by means of this state. The latch 604 may be implemented as a flip-flop with the positive outlet Q 101'''' and the negative outlet Qneg, which has the negated value of the positive outlet 101''''.

FIG. 7 shows a time-voltage diagram 700 of a detection threshold definable by means of the primary-side comparator 408 for a function test of the primary-side comparator according to an example embodiment of the present invention. The time is shown on the x-axis, and a voltage value based on the reference potential UZM is shown on the y-axis. The time axis is divided into 5 time periods I, II, III, IV, V. Curve 408a' indicates the curve of the primary-side upper detection threshold for the current I1 as a voltage curve 408a', which detection threshold is definable by the setting link 411 by means of the first operation booster 408a. Curve 408b' indicates the curve of the primary-side upper detection threshold for the current I1 as a voltage curve 408b', which detection threshold is definable by the setting link 411 by means of the first operation booster 408a. Curve 601' indicates the voltage curve of the signal recorded by the measuring coil 601 or the current sensor 601 in the first primary-side measuring line 101'''', which indicates whether the voltage curve 601' is proportional to the primary current I1. The measuring signal 601' is sinusoidal and has the primary coil frequency of 85 kHz.

The definable primary-side lower detection threshold 408a' and the definable primary-side upper detection threshold 408b' can essentially be set among voltage values UZM, x UZM, and y UZM, each of which is based on the potential UZM.

Time period I corresponds to a duty factor of the PWM signal provided via the setting link 411 of 0% and indicates an invalid state. Time period II corresponds to a duty factor of the PWM signal provided via the setting link 411 which can vary between 0% and less than 50% and likewise indicates an invalid state.

A duty factor of 50% is set in time period III for the PWM signal provided via the setting link 411, and there is a valid state in which the definable primary detection threshold corresponds to a primary current I1 of 0 A. The primary comparator 408 can be operated in time period III in order to implement the test method for the functionality of the primary comparator 408.

A duty factor between 50% and 100% is set in time period IV for the PWM signal provided via the setting link 411, and there is a valid state in which the definable primary detection threshold corresponds to a primary current I1 of 0 A to 100 A.

A duty factor of 100% is set in time period V for the PWM signal provided via the setting link 411, and there is a valid state in which the definable primary detection threshold corresponds to a primary current I1 of 100 A.

It should be noted in addition that "comprising", "including", and "having" does not exclude any other elements or steps and "one" or "a" does not exclude any plurality. Furthermore, it should be noted that features or steps which have been described with reference to one of the previous example embodiments may also be used in combination with other features or steps of other previously described example embodiments. Reference numerals in the claims are not to be considered a limitation.

The invention claimed is:

1. A secondary circuit device comprising:
    a secondary coil for transmitting and/or receiving magnetic energy of a magnetic field and for converting the magnetic energy into electrical energy, wherein the magnetic field is generated by a primary coil of a primary circuit device;
    an energy transmission unit for transmitting the electrical energy, wherein the energy transmission unit includes an inlet and an outlet, the inlet for connecting the secondary coil and the outlet for providing the electrical energy as voltage and/or current;
    a clamper circuit unit connected to the secondary coil; and
    a secondary-side detection unit i-connected to the inlet and/or the outlet of the energy transmission unit, the secondary-side detection unit configured to detect an overvoltage at the inlet and/or the outlet of the energy transmission unit, and when the overvoltage is detected, the secondary-side detection unit further configured to influence the magnetic field in the secondary coil via triggering of the clamper circuit unit such that a current jump and/or a voltage jump is induced in the primary coil of the primary circuit device detectible by the primary circuit device for switching off generation of the magnetic field.

2. The secondary circuit device according to claim 1, wherein the secondary-side detection unit includes a secondary-side comparator for detecting the overvoltage.

3. The secondary circuit device according to claim 2, further comprising a secondary-side control unit configured to specify a limit value of the secondary-side comparator.

4. The secondary circuit device according to claim 1, wherein the clamper circuit unit is configured to react with at least one protective measure upon the detection of the overvoltage at the inlet and/or at the outlet of the energy transmission unit, the at least one protective measure selected from the group of protective measures consisting of:
    short-circuiting the inlet of the energy transmission unit;
    short-circuiting the outlet of the energy transmission unit;
    detuning the energy transmission unit; and
    splitting an oscillating circuit formed with the secondary coil.

5. The secondary circuit device according to claim 1, further comprising a secondary-side communication device configured for establishing a communication channel with the primary circuit device.

6. A system for energy transmission, the system comprising:
  a car-pad-module unit comprising a secondary circuit device, the secondary circuit device comprising:
  a secondary coil for transmitting and/or receiving magnetic energy of a magnetic field and for converting the magnetic energy into electrical energy, wherein the magnetic field is generated by a primary coil of a primary circuit device;
  an energy transmission unit for transmitting the electrical energy, wherein the energy transmission unit includes an inlet and an outlet, the inlet for connecting the secondary coil and the outlet for providing the electrical energy as voltage and/or current;
  a clamper circuit unit connected to the secondary coil; and
  a secondary-side detection unit connected to the inlet and/or the outlet of the energy transmission unit, the secondary-side detection unit configured to detect an overvoltage at the inlet and/or the outlet of the energy transmission unit, and when the overvoltage is detected, the secondary-side detection unit further configured to influence the magnetic field in the secondary coil via triggering of the clamper circuit unit such that a current jump and/or a voltage jump is induced in the primary coil of the primary circuit device detectible by the primary circuit device for switching off generation of the magnetic field; and
  a ground-pad-module unit comprising a primary circuit device, the primary circuit device comprising:
  an energy generation unit for providing electrical energy;
  a primary coil connected to the energy generation unit, the primary coil for converting the electrical energy into magnetic energy of a magnetic field, and for transmitting and/or receiving the magnetic energy; and
  a primary-side detection unit connected to the primary coil, the primary-side detection unit configured to detect a current jump and/or a voltage jump in the primary coil induced in the primary coil via influence of the magnetic field by the secondary coil of the secondary circuit device via triggering of the clamper circuit, the primary-side detection unit further configured to switch off the energy generation unit upon detection of the current jump and/or a voltage jump in the primary coil;
  wherein the secondary circuit device and the primary circuit device are coupled together via the magnetic field.

7. The system for energy transmission according to claim 6, wherein the primary-side detection unit includes a primary-side comparator for detecting the current jump and/or the voltage jump.

8. The system for energy transmission according to claim 7, further comprising a primary-side control unit configured to specify a limit value of the primary-side comparator.

9. The system for energy transmission according to claim 6, further comprising a primary-side communication device configured for establishing a communication channel with the secondary circuit device.

10. A method of testing a secondary circuit device, the secondary circuit device comprising a secondary coil, an energy transmission unit, a clamper circuit and a secondary-side detection unit, the secondary coil for transmitting and/or receiving magnetic energy of a magnetic field and for converting the magnetic energy into electrical energy, wherein the magnetic field is generated by a primary coil of a primary circuit device, the energy transmission unit for transmitting the electrical energy, wherein the energy transmission unit includes an inlet and an outlet, the inlet for connecting the secondary coil and the outlet for providing the electrical energy as voltage and/or current, the clamper circuit unit connected to the secondary coil, and the secondary-side detection unit connected to the inlet and/or the outlet of the energy transmission unit, the secondary-side detection unit configured to detect an overvoltage at the inlet and/or the outlet of the energy transmission unit, and when the overvoltage is detected, the secondary-side detection unit further configured to influence the magnetic field in the secondary coil via triggering of the clamper circuit unit such that a current jump and/or a voltage jump is induced in the primary coil of the primary circuit device detectible by the primary circuit device for switching off generation of the magnetic field, the method comprising:
  coupling the secondary circuit device with the primary circuit device via the magnetic field, the primary circuit device comprising an energy generation unit, a primary coil, and primary-side detection unit, the energy generation unit for providing electrical energy, the primary coil connected to the energy generation unit the primary coil for converting the electrical energy into magnetic energy of a magnetic field and for transmitting and/or receiving the magnetic energy, the primary-side detection unit configured to detect the current jump and/or a voltage jump in the primary coil induced in the primary coil via influence of the magnetic field by a secondary coil of a secondary circuit device via triggering of a clamper circuit, the primary-side detection unit further configured and to switch off the energy generation unit upon detection of the current jump and/or a voltage jump in the primary coil;
  specifying energy to be transmitted by primary coil of the primary circuit device in a form of a power specification;
  reducing a detection threshold so that an overvoltage is detectible in the secondary-side detection unit;
  triggering the clamper circuit based on detection of the overvoltage so as to influence the magnetic field in the secondary coil; and
  evaluating a current jump and/or a voltage jump induced in the primary coil of the primary circuit device as a result of the influence to the magnetic field.

11. A method of testing a primary circuit device, the primary circuit device comprising an energy generation unit, a primary coil, and a primary-side detection unit, the energy generation unit for providing electrical energy, the primary coil connected to the energy generation unit, the primary coil for converting the electrical energy into magnetic energy of a magnetic field and for transmitting and/or receiving the magnetic energy, and the primary-side detection unit connected to the primary coil, the primary-side detection unit configured to detect a current jump and/or a voltage jump in the primary coil induced in the primary coil via influence of the magnetic field by a secondary coil of a secondary circuit device via triggering of a clamper circuit, the primary-side detection unit further configured to switch off the energy generation unit upon detection of the current jump and/or the voltage jump in the primary coil, the method comprising:
  detecting coupling of the primary circuit device with a secondary circuit device, the secondary circuit device comprising a secondary coil, an energy transmission unit, a clamper circuit, and a secondary-side detection unit, the secondary coil for transmitting and/or receiving magnetic energy of a magnetic field and for converting the magnetic energy into electrical energy, the energy transmission unit for transmitting the electrical energy, wherein the energy transmission unit includes an inlet and an outlet, the inlet for connecting the secondary coil and the outlet for providing the electrical energy as voltage and/or current, the clamper circuit unit connected to the secondary coil, and the secondary-side detection unit connected to the inlet and/or the outlet of the energy transmission unit, the secondary-side detection unit configured to detect an overvoltage at the inlet and/or the outlet of the energy transmission unit, and when the overvoltage is detected, the secondary-side detection unit further configured to influence the magnetic field in the secondary coil via triggering of the clamper circuit unit such that a current jump and/or a voltage jump is induced in the primary coil of the primary circuit device detectible by the primary circuit device for switching off generation of the magnetic field;

reducing a detection threshold in order to simulate a current jump and/or a voltage jump in the primary coil of the primary circuit device;

detecting in the primary-side detection unit the current jump and/or the voltage jump as simulated; and evaluating a reaction of the primary-side detection unit to the current jump and/or the voltage as detected.

* * * * *